UNITED STATES PATENT OFFICE.

RUSSELL S. PENNIMAN AND JOHN C. SCHRADER, OF DOVER, NEW JERSEY, ASSIGNORS TO THE ATLANTIC DYNAMITE COMPANY OF NEW JERSEY, OF KENVIL, NEW JERSEY.

HIGH-EXPLOSIVE COMPOUND.

SPECIFICATION forming part of Letters Patent No. 647,607, dated April 17, 1900.

Application filed May 16, 1892. Serial No. 433,188. (No specimens.)

*To all whom it may concern:*

Be it known that we, RUSSELL S. PENNIMAN and JOHN C. SCHRADER, both of Dover, in the county of Morris and State of New Jersey, have invented certain new and useful Improvements in High-Explosive Compounds; and we do hereby declare that the following specification is a clear, true, and complete description of our invention.

Explosive compounds embodying our present invention contain nitroglycerin in various percentages, as is usual in many high-explosive compounds; but the liquid explosive is held or carried in or by a dope in which the service of a carbon ingredient is performed wholly or in part by finely-homogeneous sulpho-resinous matter or vulcanized rosin, this latter being, as we believe, a novel body or product in this art. In many old and well-known nitroglycerin compounds rosin and sulphur have been employed as ingredients in the dope, and they have both been used separately and also in some cases in the same compound; but so far as our knowledge extends the rosin and sulphur have never been so combined and prepared as to unite them into one homogeneous resinous ingredient capable of maintaining its normal condition in the compound, this being one of the objects sought by us. In a nitroglycerin compound containing finely-divided rosin and also finely-divided sulphur the rosin is unaffected by the presence of the sulphur, and the liquid explosive readily attacks the rosin, with the result of first making it more or less soft and adhesive, followed by a solidification of the entire mass, which renders the compound of little value as an explosive.

In the preparation of certain grained dopes heretofore used in low-grade high-explosive compounds rosin and sulphur have been melted together in the presence of other solid matter and relied upon while in a softened condition to operate as an adhesive medium for binding together said other solid but finely-divided matter, such as coal carbon and nitrate of soda, the resultant mass being small composite solid grains which are in themselves non-absorbents of the nitroglycerin, the latter being carried thereon as a surface coating or film. Prior compounds of the types last described have therefore contained rosin and sulphur united as by softening or melting, but not so combined that the two constituted one homogeneous ingredient in the compound, because in said prior compounds the sulphur and rosin were also intimately and solidly united with other matter in the formation of non-absorbent grains, whereas in our novel compounds the sulpho-resinous matter is present in homogeneous grains or finely-divided particles complete in themselves and capable of serving either as the sole carbon ingredient in the dope in a nitroglycerin compound or as a separate and distinct portion or portions of a dope containing separately-grained or finely-divided solid forms of carbon suitable in high-explosive compounds. If, however, special dopes are desired for producing dry-grained, free-running nitroglycerin powder, the vulcanized rosin can be relied upon as the adhesive medium for uniting therewith other finely-divided ingredients in producing porous and specially-absorbent grains in accordance with the invention disclosed in the patent issued to John C. Schrader, April 14, 1891, No. 450,591. In all of said compounds so produced prior to our invention the resinous matter has been and could only be used in small proportions, whether used therein in its natural but powdered condition or as an adhesive element with sulphur and softened or melted therewith for operating as a close and solid binding medium with respect of other solid matter in producing non-absorbent grained dope. In other words, although there is no form of carbon known in the art as effective as rosin it could not be heretofore employed liberally, because of the adverse effects thereon by the liquid explosive, which have been hereinbefore referred to. Another important object of our invention is to produce nitroglycerin compounds containing unusually large proportions of resinous matter and in which the latter may, if desired, constitute the sole substitute for the usual ingredient—carbon—accompanied by no more sulphur than is requisite or desirable, thus affording with suitable nitrates explosive compounds having specially-desirable specific gravity and high gas-producing capacities and in which the percentage of nitroglycerin may be varied for producing any of the ordinary grades of powder, ranging from four or five per cent. to thirty-five per cent., and even considerably upward, without rendering the mass clingy or pasty or liable to cake or harden (except that hardening which is always incident to low temperature) and in which the dope will maintain a safe and permanent control over the nitroglycerin as to leakage.

The sulpho-resinous matter which constitutes a novel integral element in our novel explosive compounds may be properly termed "vulcanized rosin," because by our treatment of rosin and sulphur the resinous matter is so far changed in its character that it is practically a resistant of the softening influences of nitroglycerin, whereas the natural rosin readily succumbs thereto. In a contemporaneous application for Letters Patent (see Serial No. 433,187) we have fully disclosed the said vulcanized rosin, as well as a method of its production, and for the purposes of this specification it will only be necessary to state that the said vulcanized rosin is best produced by melting two parts of rosin with one part of sulphur and raising to a temperature of, say, 300° to 320° Fahrenheit, far above the melting-point of sulphur, (239°,) this latter being far above the melting-point of rosin, and maintaining the mass at said high temperature for a varied time, best limited by a subsidence of incident foaming. The mass is then cooled into a solid condition, then broken up and finely comminuted for use by itself as an ingredient in or component of dopes containing other suitable solid but finely-divided matter.

Broadly stated, an explosive compound embodying our present invention consists of nitroglycerin carried in or by a dope composed of finely-divided solid matter in which the substitute for the usual forms of carbon is in whole or in part made up of grains or particles of vulcanized rosin, said particles containing only sulphur and rosin united, so as to constitute an integral ingredient which serves as carbon in the compound.

No nitroglycerin compound known to us prior to our present invention has contained united rosin and sulphur in grains or fine particles, so that said two elements could operate as one independent component in the dope, as distinguished from rosin, sulphur, and other solid matters mixed in mass or mixed, heated, and united in non-absorbent grains.

If the sulphur and the rosin be merely melted together, and thus by being bodily united—i.e., rendered homogeneous—and then cooled, hardened, and broken up and ground or pulverized, the so-united rosin and sulphur would be a novel and valuable product far more effective for use as a dope ingredient than when sulphur and rosin are used, as heretofore, because the pulverizing of the bodily-united rosin and sulphur would afford homogeneous particles of the so-combined rosin and sulphur much finer than could result from graining a plastic mass containing melted sulphur and rosin, and the resinous matter could better resist the softening influences of the nitroglycerin than if the rosin and the sulphur were pulverized either separately or together (but without previous melting) and cooling and then mixed together in the forming of dope, and, moreover, larger proportions of the resinous matter can be successfully employed if it be first bodily united with the sulphur and then cooled and pulverized, and especially if the rosin be fully vulcanized.

For producing one general class of our improved nitroglycerin powder or compound we, as hereinbefore indicated, rely upon the finely-divided vulcanized rosin for operating as the sole carbon ingredient in the dope or dry material containing a suitable nitrate and with which from four or five to thirty-five or forty per cent. of nitroglycerin is well mixed, the resulting compounds being highly effective, very safe, and practically unchangeable. The low-grade powders of this class are specially effective, as will be evident from the fact that under the usual mortar tests a seven-per-cent. nitroglycerin compound containing the vulcanized rosin equals in efficiency any of the twenty-per-cent. compounds containing an equal nitrate and a corresponding proportion of what we believe to be the very best of the several usual forms of solid carbon.

We employ in dope for compounds intended for a wide or universal range of service pulverized nitrate of soda eighty-two (82) parts and the pulverized vulcanized rosin eighteen (18) parts, the mass being dry and thoroughly mixed. This dope is admirably adapted for use in powders of all grades, ranging from four or five to thirty-five per cent. of nitroglycerin, and for the highest service required the last-named percentage need seldom be exceeded, because any of our compounds containing any given percentage of the liquid explosive can be relied upon for the performance of such duty as would require twice the percentage of nitroglycerin with the best of the several old forms of dope of which we have knowledge.

Other well-known nitrates may be employed; but none are better suited for the purpose than the nitrate of soda.

The compounds described as produced by us when the vulcanized rosin is the sole substitute for carbon are of course quite light colored, because of the light color of both the vulcanized rosin and the nitrate; but they can of course be varied as to color without materially changing their character—as, for instance, by the use therein of small quantities of the more ordinary forms of carbon—such as charcoal, anthracite, and bituminous coals; but in proportion as these other forms of carbon are used, with a corresponding retirement of the vulcanized rosin, additional sulphur should be employed. It is to be understood, however, that no good results will accrue from the use of said ordinary forms of carbon, and it is also to be understood that with the vulcanized resinous matter if more sulphur be used than one part thereof to two of rosin much of the sulphur will be practically wasted, and if the excess be too great it will correspondingly impair the efficiency of the compound. If, however, the compound desired be of the dry-grained free-running variety, as heretofore produced by us with coal carbons and sulphur, the vulcanized rosin may contain an excess of sulphur, and especially if coal carbon be used with the vulcanized rosin.

Having thus described our invention, we claim as new and desire to secure by Letters Patent—

1. An explosive compound consisting of nitroglycerin and a dope, in which the ingredient relied upon to serve as a carbon ingredient is wholly composed of finely-divided vulcanized rosin, substantially as described.

2. In a nitroglycerin compound, a dope containing vulcanized rosin, substantially as described.

3. In a nitroglycerin compound, a dope containing homogeneously-united rosin and sulphur in a finely divided or pulverized condition, substantially as described.

RUSSELL S. PENNIMAN.
JOHN C. SCHRADER.

Witnesses:
CLAUS J. ANDERSON,
SYDNEY T. SMITH.